United States Patent
Xin et al.

(10) Patent No.: US 8,054,919 B2
(45) Date of Patent: Nov. 8, 2011

(54) METHOD AND APPARATUS FOR GENERATING TRAINING SEQUENCE CODES IN A COMMUNICATION SYSTEM

(75) Inventors: Yan Xin, Suwon-si (KR); Jongsoo Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 817 days.

(21) Appl. No.: 12/053,836

(22) Filed: Mar. 24, 2008

(65) Prior Publication Data

US 2008/0232515 A1    Sep. 25, 2008

(30) Foreign Application Priority Data

Mar. 22, 2007 (KR) ................. 10-2007-0028308
Apr. 4, 2007 (KR) ................. 10-2007-0033499

(51) Int. Cl.
*H03D 1/00* (2006.01)
(52) U.S. Cl. .................. 375/343; 370/329
(58) Field of Classification Search .......... 370/292, 370/329, 343, 394; 375/140, 222
See application file for complete search history.

(56) References Cited

U.S. PATENT DOCUMENTS

| | | | |
|---|---|---|---|
| 6,560,321 B1 * | 5/2003 | Chen et al. | ............ 379/100.17 |
| 7,027,444 B2 | 4/2006 | Kim et al. | |
| 7,103,088 B2 | 9/2006 | Misra et al. | |
| 7,369,531 B2 | 5/2008 | Cho et al. | |
| 2009/0225707 A1 * | 9/2009 | Baldemair et al. | ............ 370/329 |

FOREIGN PATENT DOCUMENTS

| | | |
|---|---|---|
| KR | 1020020039589 | 5/2002 |
| KR | 1020050041803 | 5/2005 |
| KR | 1020050046022 | 5/2005 |
| KR | 1020080074245 | 8/2008 |
| WO | WO 98/07291 | 2/1998 |
| WO | WO 00/38350 | 6/2000 |
| WO | WO 02/074003 | 9/2002 |

* cited by examiner

*Primary Examiner* — David C. Payne
*Assistant Examiner* — Leon-Viet Nguyen
(74) *Attorney, Agent, or Firm* — The Farrell Law Firm, P.C.

(57) ABSTRACT

A method and apparatus for generating training sequence codes in a communication system. In the method, a pair of sequences A and B having cross-correlation properties as well as autocorrelation properties are generated, and protection sequences A' and B' are generated by copying last L symbols of the sequences A and B, respectively. The training sequence codes are generated by locating the protection sequences A' and B' in the most significant positions (MSPs) of the sequences A and B. The training sequence codes can be extended and applied to 16-QAM and 32-QAM used in a GERAN system, and the use of such training sequence codes enables data to be efficiently transmitted/received without performance deterioration in a GERAN system.

13 Claims, 10 Drawing Sheets

FIG.3
(PRIOR ART)

| TSC# | Binary Training Sequence Symbols |
|---|---|
| 0 | (-1,-1,1,1,1,-1-1,1,-1,-1,1,1,1,1,1,-1,1,-1,-1,-1,-1,-1,1,-1,1,-1,-1) |
| 1 | (1,-1,1,-1,-1,-1,-1,-1,1,-1,1,-1,-1,-1,-1,1,1,1,-1,-1,1,-1,-1,1,1,1) |
| 2 | (1,-1,1,-1,-1,-1,-1,-1,1,-1,1,-1,-1,1,1,-1,-1,-1,1,1,-1,1,1,-1,-1,-1) |
| 3 | (-1,-1,1,1,1,-1,-1,1,-1,-1,1,1,1,-1,1,-1,1,1,1,1,1,-1,1,-1,1,1) |
| 4 | (1,-1,-1,1,-1,-1,-1,-1,1,-1,-1,1,-1,1,1,1,-1,1,-1,-1,-1,1,1,1,-1,1) |
| 5 | (1,1,1,-1,1,-1,-1,-1,1,1,1,-1,1,1,-1,-1,1,-1,-1,-1,-1,1,-1,-1,1,-1) |
| 6 | (1,-1,-1,1,-1,-1,-1,-1,1,-1,-1,1,-1,-1,-1,-1,1,-1,1,1,1,-1,-1,-1,1,-1) |
| 7 | (1,1,1,-1,1,-1,-1,-1,1,1,1,-1,1,-1,1,1,-1,1,1,1,1,-1,1,1,-1,1) |

FIG.5

| TSC# | Binary Training Sequence Symbols |
|---|---|
| 0 | (-1,1,-1,1,-1,-1,-1,-1,-1,1,-1,1,-1,1,1,-1,1,1,-1,-1,-1,1,1,-1,1,1) |
| 1 | (1,1,-1,1,1,-1,-1,-1,1,1,-1,1,1,-1,-1,-1,-1,-1,1,-1,1,-1,-1,-1,-1,-1) |
| 2 | (-1,1,-1,-1,-1,-1,-1,1,-1,1,-1,-1,-1,-1,-1,1,1,-1,1,1,-1,-1,-1,1,1,-1) |
| 3 | (1,1,-1,-1,1,-1,-1,1,1,1,1,-1,-1,1,1,1,1,-1,1,-1,1,1,1,1,1,-1,1) |
| 4 | (1,-1,-1,1,-1,-1,-1,-1,1,-1,-1,1,-1,1,-1,1,-1,1,-1,-1,1,1,1,1,-1,1,-1,-1) |
| 5 | (1,1,-1,-1,1,-1,1,-1,1,1,-1,-1,1,-1,1,1,-1,-1,-1,-1,-1,-1,1,1,-1,-1) |
| 6 | (1,-1,-1,-1,1,-1,1,1,1,1,-1,-1,-1,1,-1,-1,-1,1,-1,-1,1,-1,-1,-1,-1,1,-1) |
| 7 | (1,1,1,1,-1,-1,1,1,1,1,1,1,-1,-1,1,-1,1,1,-1,-1,1,-1,1,-1,1,1) |

FIG.6

| TSC# | Binary Training Sequence Symbols |
|---|---|
| 0 | (-1,-1,-1,-1,1,1,-1,-1,1,-1,-1,-1,-1,-1,1,1,-1,1,1,-1,-1,-1,-1,1,-1,1,-1,1,1,-1,-1) |
| 1 | (-1,1,-1,1,-1,-1,-1,-1,1,1,-1,1,-1,1,-1,-1,1,1,-1,1,1,-1,-1,1,1,1,1,1,-1,1,1) |
| 2 | (-1,1,-1,1,1,-1,-1,1,1,1,-1,1,-1,1,1,-1,-1,-1,1,1,-1,1,-1,-1,-1,-1,-1,-1,1,1,-1) |
| 3 | (-1,-1,-1,-1,-1,1,-1,1,1,-1,-1,-1,-1,-1,1,1,-1,-1,-1,1,1,-1,-1,1,-1,1,-1,-1,-1,-1,1) |
| 4 | (-1,1,-1,1,1,-1,-1,1,1,1,-1,1,-1,1,1,-1,-1,-1,-1,-1,1,-1,1,1,1,-1,-1,-1,-1,-1,-1,1) |
| 5 | (1,1,1,-1,-1,1,-1,1,1,1,1,1,1,-1,-1,1,-1,1,1,1,-1,-1,1,1,-1,1,1,-1,1,1,1,-1) |
| 6 | (-1,-1,-1,-1,1,1,-1,-1,1,-1,-1,-1,-1,-1,1,1,-1,1,-1,1,1,1,1,-1,-1,1,-1,1,-1,1,1,1) |
| 7 | (1,-1,1,1,-1,-1,-1,-1,1,-1,1,-1,1,1,-1,-1,-1,-1,1,-1,-1,1,1,-1,-1,-1,-1,-1,1,-1,-1) |

FIG.10

| TSC# | Binary Training Sequence Symbols |
|---|---|
| 0 | (-1,1,-1,-1,1,1,-1,-1,-1,-1,-1,1,-1,-1,1,1,-1,1,-1,1,1,-1,-1,-1,-1,1,-1,1,-1,1,1) |
| 1 | (1,1,-1,1,-1,1,-1,-1,-1,-1,1,1,-1,1,-1,1,-1,1,1,-1,1,1,1,1,1,-1,-1,1,1,-1,1) |
| 2 | (1,-1,-1,-1,-1,1,-1,1,-1,1,1,-1,-1,-1,-1,1,-1,-1,-1,-1,1,-1,-1,1,1,-1,-1,-1,-1,-1) |
| 3 | (1,1,1,1,1,-1,-1,1,1,-1,1,1,1,1,1,-1,-1,-1,-1,-1,1,1,-1,1,-1,1,-1,-1,-1,-1,1,1) |
| 4 | (-1,-1,-1,-1,1,1,-1,1,-1,-1,-1,-1,-1,-1,1,1,1,1,-1,1,-1,-1,-1,1,1,-1,-1,1,1,-1,-1) |
| 5 | (-1,-1,1,-1,1,1,-1,-1,1,1,-1,-1,-1,1,1,-1,1,-1,-1,1,1,1,1,1,1,-1,1,1,-1,-1,1,1,1,1) |
| 6 | (-1,1,-1,-1,-1,-1,-1,-1,1,1,-1,1,1,-1,-1,-1,-1,-1,1,1,1,-1,-1,1,-1,1,-1,-1,1,1,1,-1,-1) |
| 7 | (-1,-1,1,1,-1,-1,-1,1,-1,1,1,-1,-1,1,1,-1,-1,1,1,1,-1,1,1,-1,-1,1,1,1,1,1,1,1,-1,1) |

FIG.11

METHOD AND APPARATUS FOR GENERATING TRAINING SEQUENCE CODES IN A COMMUNICATION SYSTEM

PRIORITY

This application claims priority to applications entitled "Method and Apparatus for Generating Training Sequence Codes in a Communication System" filed in the Korean Industrial Property Office on Mar. 22, 2007 and assigned Serial No. 2007-28308 and filed on Apr. 4, 2007 and assigned Serial No. 2007-0033499, respectively, the contents of which are hereby incorporated by reference.

BACKGROUND OF THE INVENTION

1. Field of the Invention

The present invention relates generally to a method and apparatus for generating training sequence codes in a communication system, and more particularly to a method and apparatus for generating training sequence codes in a GSM (Global System for Mobile Communication)/EDGE (Enhanced Data Rates for Global Evolution) RAN (Radio Access Network) ("GERAN") system.

2. Description of the Related Art

The 3GPP ($3^{rd}$ Generation Partnership Project) TSG (Technical Specification Group)—GERAN Standards Conference is working on GERAN evolution for performance improvements, such as an increased data transmission rate, high spectral efficiency, etc. As such, high-order QAM (Quadrature Amplitude Modulation) schemes including 16-QAM and 32-QAM have been added to the conventional modulation schemes including GMSK (Gaussian Minimum Shift Keying) and 8-PSK (Phase Shift Keying) in order to improve downlink performance and uplink performance.

Also, in order to increase a data transmission rate and spectral efficiency, a new symbol transmission rate of 325 ksymbols/s has been added to the existing symbol transmission rate of 270.833 ksymbols/s. The new symbol transmission rate (1.2 times as high as the existing symbol transmission rate) is applied to both downlink and uplink, and will likely be reflected in the GERAN standards in the latter half of 2007.

As mentioned above, GMSK and 8-PSK are used as modulation schemes in the conventional GERAN system. The GMSK scheme, which is a scheme for limiting the bandwidth of binary data by passing the binary data through a Gaussian low-pass filter and then performing frequency modulation with a certain deviation ratio, allows an interval between two frequencies to continuously vary, thereby achieving superior spectral convergence and high out-of-band spectrum suppression. The 8-PSK scheme, which is a scheme for modulating data in such a manner as to correspond to a phase-shifted code of a carrier, can increase frequency efficiency. There are nine techniques for packet data traffic channels (PDTCH) that are defined as coding schemes used in the EDGE/EGPRS system. The nine techniques include nine modulation and coding schemes (MCSs) for EDGE/EGPRS, MCS-1 to MCS-9. MCS-1 to MCS-4 each use the GMSK modulation scheme, and MCS-5 to MCS-9 each use the 8-PSK modulation scheme. In actual communication, one of various combinations of the modulation schemes and the coding techniques is selected and used. The MCS scheme used in transmission is determined by estimated channel quality.

FIG. 1 illustrates a structure of a downlink transmitter in a conventional GERAN system.

Referring to FIG. 1, a Radio Link Control (RLC) packet data block (RLC block) is forwarded to a channel encoder 110. In the channel encoder 110, the RLC block is encoded with a convolutional code, is punctured according to a defined puncturing pattern, and then is forwarded to an interleaver 120. The interleaver 120 interleaves the data, and forwards the interleaved data to a multiplexer 140 for data allocation to physical channels. In addition, RLC/MAC header information, an uplink state flag (USF), and a code identifier bit 130 are also forwarded to the multiplexer 140. The multiplexer (burst mapper) 140 distributes the collected data to four normal bursts, and allocates the respective bursts to timeslots of a TDMA (Time Division Multiple Access) frame. The data in each burst is modulated through a modulator 150, and then is forwarded to a training sequence rotator 160. The training sequence rotator 160 adds a training sequence code (TSC) to the modulated data, performs phase rotation for the data with the TSC added thereto, and then forwards the phase-rotated data to a transmitter 170. Units additionally needed for transmitting the modulated signal, for example, a digital-to-analog (D/A) converter, are well known to those skilled in the art, so a detailed description thereof will be omitted herein.

FIG. 2 illustrates a structure of a downlink receiver in a conventional GERAN system.

Referring to FIG. 2, transmitted bursts are received at a radio front-end stage 210 through a receive antenna. The received data is forwarded to a training sequence derotator 220 and a buffering and derotation unit 260, and the buffering and derotation unit 260 performs buffering and derotation. A modulation scheme detection and channel estimation unit 270 detects a modulation scheme and estimates channel information by using data output from the buffering and derotation unit 260. The training sequence derotator 220 performs phase derotation for the received data in a manner corresponding to the operation in the training sequence rotator 160 of the transmitter of FIG. 1.

An equalizer block 230 equalizes and demodulates the phase-derotated data, based on the detected modulation scheme and the estimated channel information, and then forwards the equalized and demodulated data to a deinterleaver 240. The deinterleaver 240 deinterleaves the data output from the equalizer 230, and then forwards the deinterleaved data to a channel decoder 250. The channel decoder restores the data forwarded thereto.

Figure 3:
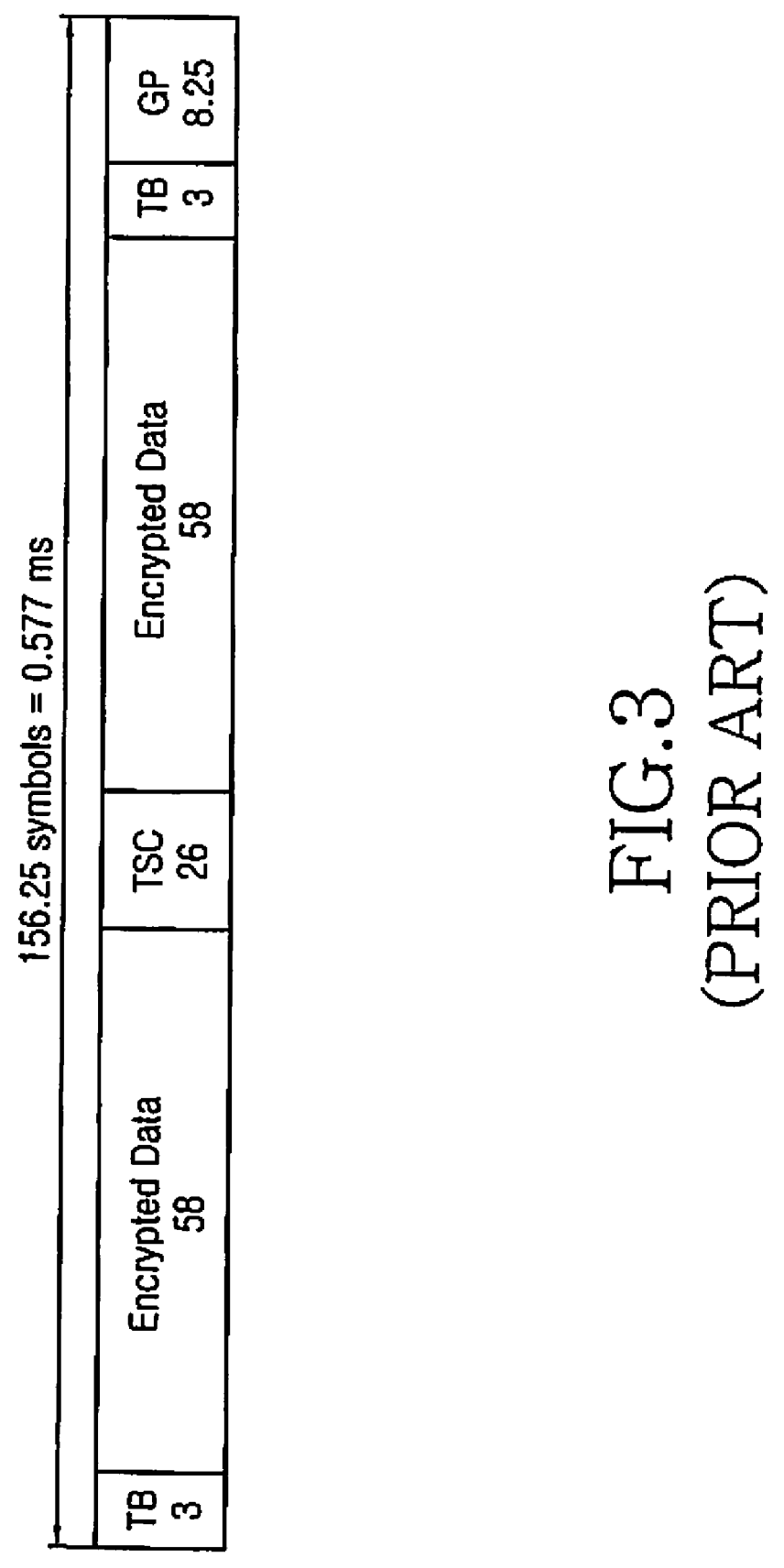

FIG. 3 illustrates a structure of a normal burst used in a conventional GERAN system.

As illustrated in FIG. 3, in transmitting data in the conventional GERAN system, a TSC consisting of 26 or 31 symbols is located in the middle of the normal burst. The TSC standards define eight types of TSCs, which are actually used in networks and terminals, and one and the same TSC is allocated within one cell. A TSC is used in an equalizer that estimates radio channel state information to remove noise and interference included in a received signal in a receiver. Also, the receiver measures channel quality or link quality from the TSC, and reports it to a transmitter, thereby enabling the transmitter to perform link quality control (LQC).

A conventional TSC consists of codes that are excellent in autocorrelation properties. Accordingly, the conventional TSC shows good characteristics when channel estimation is performed for one channel without considering inter-channel inference (ICI). In general, a cell structure in a cellular system is designed such that carrier frequencies are reused at a sufficient distance by considering co-channel interference (CCI). However, as the frequency of reuse of carrier frequencies increases, CCI also increases, which results in a significant influence on the performance of channel estimation and signal detection. Therefore, in a cellular system, such as GSM, it is preferred that channel estimation is accurately performed using a joint channel estimation method when there is heavy CCI. The performance of the joint channel estimation method is greatly affected by cross-correlation properties between TSCs. However, since TSCs in use in GERAN have been employed using a design scheme in which cross-correlation properties are wholly disregarded, system performance deteriorates in a CCI environment, and additionally lowering of system performance may be caused when the conventional TSCs is extended and applied to high-order QAM schemes including 16-QAM and 32-QAM, which are employed in a GERAN evolution system.

SUMMARY OF THE INVENTION

Accordingly, the present invention has been designed to solve at least the above-mentioned problems occurring in the prior art, and provides a new method and apparatus for generating TSCs in a GERAN system, and a new TSC configuration structure.

Further, the present invention provides a transmitter/receiver apparatus for efficiently transmitting/receiving data using TSCs according to the present invention in a GERAN system.

Further, the present invention provides a method of extending and applying newly generated TSCs to 16-QAM and 32-QAM that are employed in a GERAN system.

In accordance with an aspect of the present invention, a method of generating training sequence codes (TSCs) in a communication system is provided. The method includes generating a pair of sequences A and B that have cross-correlation properties as well as autocorrelation properties; generating a protection sequence A' by copying last L symbols of the sequence A, and generating a protection sequence B' by copying last L symbols of the sequence B; generating all sequences with a structure of A'AB'B as TSC candidates by using the generated sequences A, B, A', and B'; and selecting as many TSCs as necessary by evaluating signal-to-noise ratio (SNR) degradation of the TSC candidates.

BRIEF DESCRIPTION OF THE DRAWINGS

The above and other objects, features, and advantages of the present invention will be more apparent from the following detailed description taken in conjunction with the accompanying drawings, in which:

FIG. 3 is a diagram illustrating a structure of a normal burst used in a conventional GERAN system;

FIG. 5 is a diagram illustrating a binary TSC set generated from Golay complementary sequences accordance with an exemplary embodiment of the present invention;

FIG. 6 is a diagram illustrating a binary TSC set generated from periodic complementary sequences in accordance with an exemplary embodiment of the present invention;

FIG. 10 is a diagram illustrating a binary TSC set with a length of 31 symbols in accordance with an embodiment of the present invention; and FIG. 11 is a diagram illustrating a binary TSC set with a length of 31 symbols in accordance with an embodiment of the present invention.

DETAILED DESCRIPTION OF THE EXEMPLARY EMBODIMENT

Figure 1:
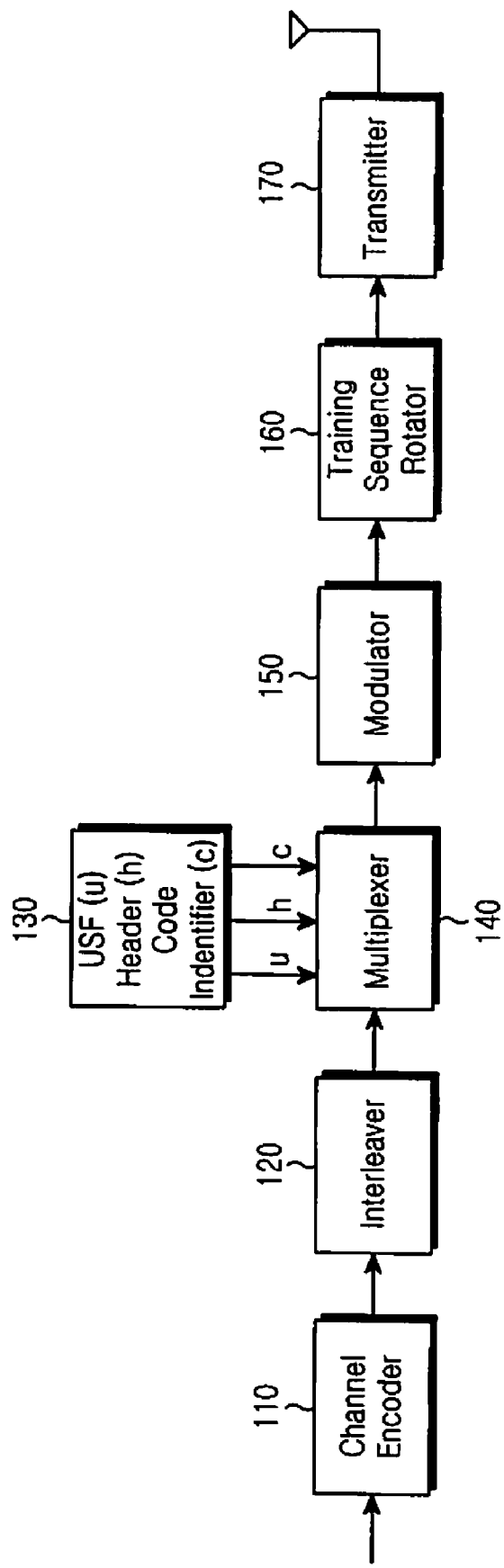
FIG. 1 is a block diagram illustrating a structure of a downlink transmitter in a conventional GERAN system.
Figure 2:
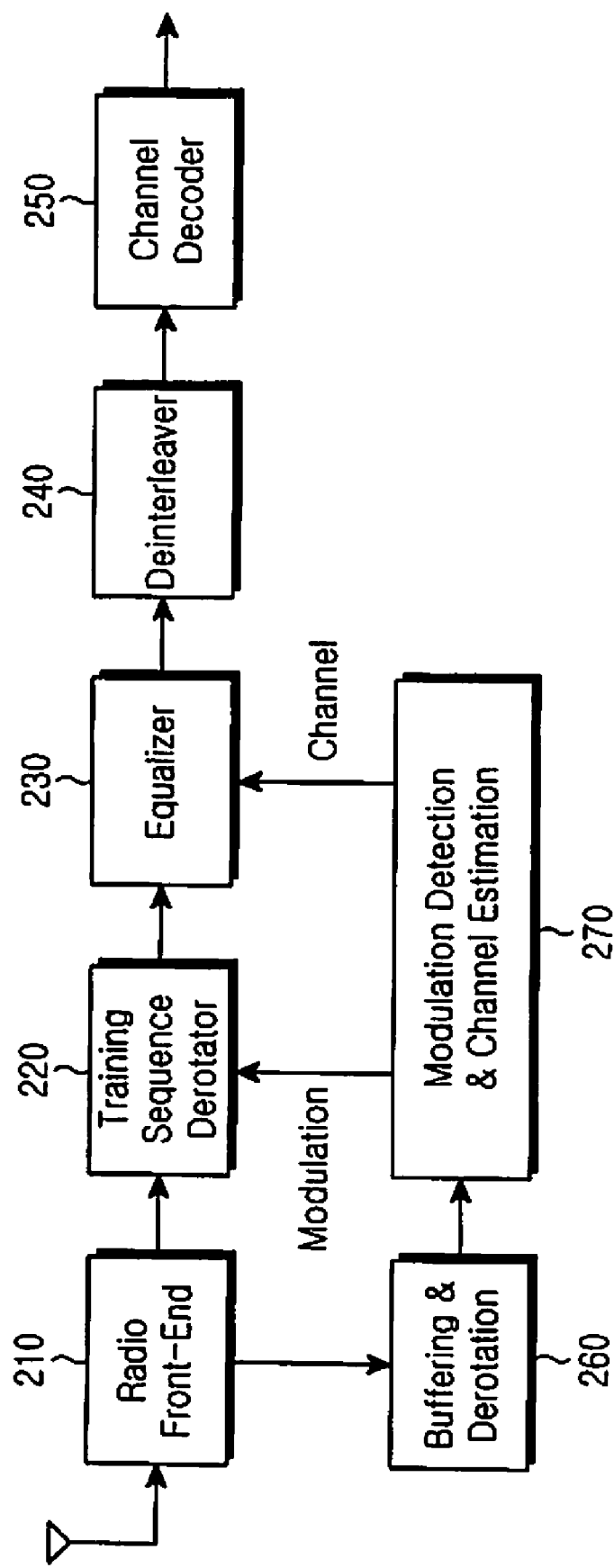
FIG. 2 is a block diagram illustrating a structure of a downlink receiver in a conventional GERAN system.

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention with unnecessary detail.

In the present invention, both autocorrelation and cross-correlation properties are considered in designing a GERAN system and TSCs for use in the GERAN system, and Golay complementary sequences are used for finding appropriate TSCs. Also, in the present invention, signal-to-noise (SNR) degradation in dB is introduced as a criterion for evaluating a mutual interference characteristic between sequences. Further, in the present invention, a min-max optimization method is introduced to find binary TSCs that are excellent in cross-correlation properties. The min-max optimization method is disclosed in commonly assigned Korean Patent Application No. 10-2007-0012983, the contents of which are hereby incorporated by reference.

Reference will now be made to a TSC configuration structure according to an exemplary embodiment of the present invention.

In the present invention, TSCs are designed using Golay complementary sequences or quasi-complementary sequences. TSCs provided by the present invention are generated in such a manner as to satisfy a TSC structure as illustrated in FIG. 4, using a pair of sequences A and B that are Golay complementary sequences or quasi-complementary sequences.

Figure 4:
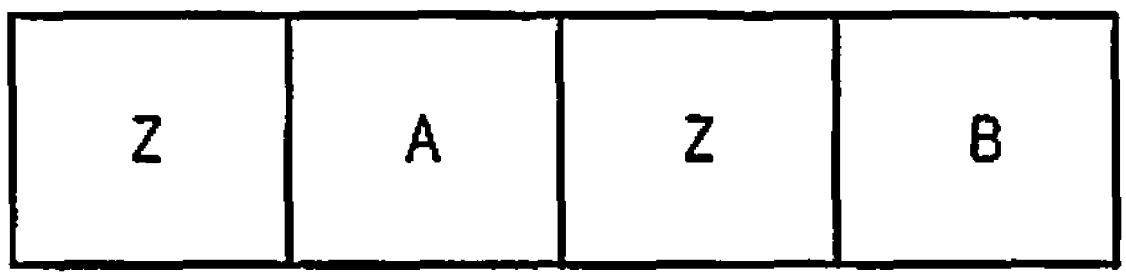
FIG. 4 is a diagram illustrating a structure of a TSC in accordance with an exemplary embodiment of the present invention.

Referring to FIG. 4, protection sequences A' and B', each of which has a length of z, are located in the most significant positions (MSPs) of the sequences A and B respectively. The protection sequences A' and B' must be set in such a manner as to be as short as possible, and simultaneously must have a sufficient length to remove inter-symbol interference (ISI) inside of a TSC or ISI inside of the sequences A and B within the same timeslot. That is, the number of symbols within one protection sequence, z, must satisfy $z \geq L-1$. Here, L is the number of channel taps.

Sequence X with a length of N' represents TSCs that are designed using a pair of complementary sequences A and B with a length of N and have a structure as illustrated in FIG. 4. That is, assuming that x is defined by $x=(x_0, \ldots, x_{N'-1})$, and N' is defined by $N'=2(N+L-1)$, a received signal sample in a receiver can be represented as shown in Equation (1) when CCI is not considered:

$$y_i = \sum_j h_j x_{i-j} + n_i, \quad (1)$$
$$i = 5, \ldots, N' - 1$$

In addition, $(x_0, \ldots, x_{z-1})$ is a protection sequence with a length of z for removing interference between data symbols and a TSC within one burst, which is caused by a channel memory. A vector representation of Equation (1) is $y=Xh^t+n$. Here, n denotes a noise vector $n=(n_0, \ldots, n_{N-1})^t$, and X denotes a matrix with a dimension of $(N'-L) \times L$, which is represented by Equation (2):

$$X = \begin{bmatrix} x_{L-1} & \cdots & x_1 & x_0 \\ x_L & \cdots & x_2 & x_1 \\ \vdots & \vdots & \vdots & \vdots \\ x_{N'-1} & \cdots & x_{N'-L+1} & x_{N'-L} \end{bmatrix} \quad (2)$$

A channel estimate using the well-known least square error estimate is represented by the Equation (3):

$$\hat{h}=(X^t X)^{-1} X^t y \quad (3)$$

In Equation (3), $X^t$ denotes a conjugate transpose matrix of X.

The channel tap length of a channel model in GSM/EDGE is 6. Thus, when, for example, L=6, the received signal sample in the receiver can be represented by Equation (4):

$$y_i = \sum_j h_j x_{i-j} + n_i, \quad (4)$$
$$i = 5, \ldots, N = 4 \text{ and } i = N + 10, \ldots, N' - 1$$

In consideration of Equation (4), a TSC matrix can be defined by Equation (5):

$$X = \begin{bmatrix} x_5 & \cdots & x_1 & x_0 \\ x_6 & \cdots & x_2 & x_1 \\ \vdots & \vdots & \vdots & \vdots \\ x_{N+4} & \cdots & x_N & x_{N-1} \\ x_{N+10} & \cdots & x_{N+6} & x_{N+5} \\ x_{N+11} & \cdots & x_{N+7} & x_{N+6} \\ \vdots & \vdots & \vdots & \vdots \\ x_{N'-1} & \cdots & x_{N'-5} & x_{N'-6} \end{bmatrix} \quad (5)$$

$$= \begin{bmatrix} a_0 & 0 & \cdots & 0 & 0 \\ a_1 & a_0 & \cdots & 0 & 0 \\ \vdots & \vdots & \vdots & \vdots & \vdots \\ a_{N-1} & a_{N-2} & \cdots & a_{N-5} & a_{N-6} \\ b_0 & 0 & \cdots & 0 & 0 \\ b_1 & b_0 & \cdots & 0 & 0 \\ \vdots & \vdots & \vdots & \vdots & \vdots \\ b_{N-1} & b_{N-2} & \cdots & b_{N-5} & b_{N-6} \end{bmatrix}$$

Considering Equation (5), each of y and it in $y=Xh^t+n$ is a vector with a size of (2N+1). Thus, using X defined in Equation (5), the least square error estimate can be calculated from Equation (3), and $X^tX$ becomes an aperiodic (or non-periodic) autocorrelation matrix with a size of (L×L). Since the sequences A and B are Golay complementary sequences or quasi-complementary sequences, $\phi=X^tX$ becomes a diagonal matrix whose diagonal elements have a value of 2N.

Assuming that there is one piece of interference for each cell in a cellular communication system, cross-correlation properties between TSCs must be optimized for joint channel estimation. If a channel impulse response of carrier and interference signals is defined by $h_l=(h_{1,0}, h_{1,1}, \ldots, h_{1,L})$, l=0, 1, a channel impulse response to two co-channel signals can be defined by $\tilde{h}=[h_0 h_1]$. Using this channel impulse response and Equation (5), the TSC matrix can be redefined by $\tilde{X}=[X_0 X_1]$. Accordingly, a received signal taking account of CCI becomes $y=\tilde{X}\tilde{h}^t+n$, and consequently the least square channel estimate is calculated as using Equation (6):

$$\hat{h}=(\tilde{X}^t\tilde{X})^{-1}\tilde{X}^t y \quad (6)$$

SNR degradation in dB (SNR_d) may be used as one criterion for evaluating a mean square error for a received signal. The SNR_d is used for evaluating cross-correlation properties between TSCs, and is defined by Equation (7):

$$SNR\_d = 10 \log_{10}(1 + tr(\Phi^{-1})) \quad (7)$$

In Equation (7), $tr(\phi^{-1})$ is a sum of main diagonal elements of a matrix $\phi^{-1}$. When cross-correlation properties of TSCs are evaluated, the smaller the value of SNR_d, the better the evaluation.

Hereinafter, a method of determining a pair of complementary sequences A and B will be described with reference to Korean Patent Application No. 10-2007-0012983, the contents of which is hereby incorporated by reference.

Regarding Golay complementary sequences, well-known Golay complementary sequences can be found from the overall sequence set with a relatively small length through computer search. More specifically, an even-shift orthogonal sequence with a length of 2N is uniquely determined by a pair of Golay complementary sequences A and B that each have a length of N.

The present invention provides a new TSC structure with two level signals. When TSCs are generated, instead of considering aperiodic (or non-periodic) autocorrelation properties and cross-correlation properties, it is possible to consider periodic correlation properties.

As illustrated in FIG. 4, TSCs of the present invention are generated based on periodic complementary sequences. Below, a method of determining optimized TSCs will be described through specific embodiments of the present invention. In the first set of exemplary embodiments of the present invention, eight different TSCs that can be used in a GERAN system and each have a length of 26 symbols. In FIG. 4, two sequences A' and B' can be generated by copying last L symbols of sequences A and B respectively. That is, TSCs are represented by Equation (8):

$$x = (\underbrace{a_{N-L}, \ldots, a_{N-1}}_{A'}, \underbrace{a_0, \ldots, a_{N-L}, \ldots, a_{N-1}}_{A}, \quad (8)$$

$$\underbrace{b_{N-L}, \ldots, b_{N-1}}_{B'}, \underbrace{b_0, \ldots, b_{N-L}, \ldots, b_{N-1}}_{B})$$

In the present invention, a description will be given of two exemplary embodiments for generating sequence pairs (A'A) and (B'B) in the TSCs defined in Equation (8).

Embodiment 1

Step 1: All sequences corresponding to two sequences A and B that satisfy Equation (9) and have aperiodic autocorrelation properties are searched:

$$R_A(k)+R_B(k)=0, \text{ for } k=\pm 1, \pm 2, \ldots, \pm K \quad (9)$$

$$R_A(k)+R_B(k)=2N, \text{ for } k=0$$

In Equation (9), $R_A(k)$ denotes cross-correlation properties of the sequence A. Also, when TSCs, each having a length of 26 symbols, are considered in Equation (9), K and N are as follows: K=5, and N=8.

Step 2: TSC candidates with the structure illustrated in FIG. 4 are constructed by deriving sequences A' and B' from the sequences A and B.

If the two sequences A and B are Golay complementary sequences, the sequence A is in autocorrelation and complementary relationships with the sequence B. With respect to the autocorrelation, there is a property as given by Equation (10):

$$R_{A'A}(k)+R_{B'B}(k)=0, \text{ for } k=\pm 1, \pm 2, \ldots, \pm K \quad (10)$$

$$R_{A'A}(k)+R_{B'B}(k)=2N, \text{ for } k=0$$

Step 3: For the TSC candidates generated in step 2, SNR_d is optimized using the min-max optimization method disclosed in Korean Patent Application No. 10-2007-0012938 to thereby find as many TSCs as necessary.

Step 4: The TSCs found in step 3 are stored.

FIG. 5 illustrates an example of a TSC set that is found according to this first embodiment of the present invention for generating sequence pairs. This TSC set is an example suitable for a normal burst in GSM/EDGE.

Embodiment 2

Step 1: All sequences corresponding to two sequences A and B that satisfy Equation (10) and have periodic autocorrelation properties are searched.

Step 2: TSC candidates with the structure illustrated in FIG. 4 are constructed by deriving sequences A' and B' from the sequences A and B.

Step 3: For the TSC candidates generated in step 2, SNR_d is optimized using the min-max optimization method disclosed in Korean Patent Application No. 10-2007-0012938 in order to find as many TSCs as necessary.

Step 4: The TSCs found in step 3 are stored.

FIG. 6 illustrates an example of a TSC set that is found according to the second embodiment for generating sequence pairs of the present invention. This TSC set is an example suitable for a normal burst in GSM/EDGE.

Figure 7:
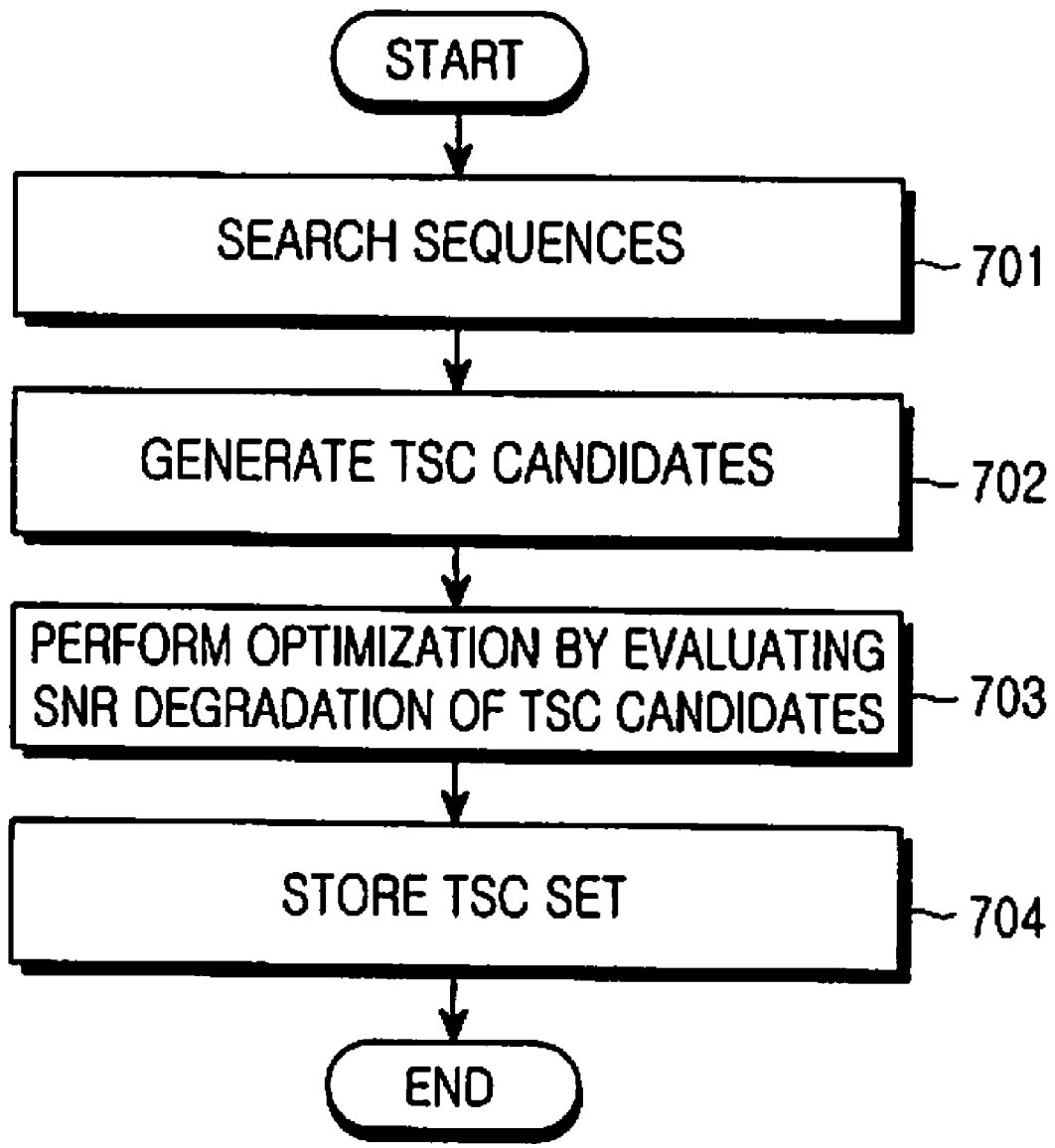
FIG. 7 is a flowchart illustrating a procedure of generating TSCs in accordance with the present invention.

FIG. 7 illustrates a procedure of generating TSCs according to an exemplary embodiment of the present invention.

Referring to FIG. 7, in step 701, sequences are searched. Sequences A and B that have aperiodic autocorrelation properties are searched in the first embodiment for generating sequence pairs of the present invention, and sequences A and B that have periodic autocorrelation properties are searched in the second embodiment for generating sequence pairs of the present invention.

In step 702, TSC candidates with the structure as illustrated in FIG. 4 are generated.

In step 703, optimization is performed through SNR_d evaluations of the TSC candidates. Here, the min-max optimization method disclosed in Korean Patent Application No. 10-2007-0012938 may be used as an optimization method.

Finally, in step 704, a set of the optimized TSCs is stored.

Reference will now be made to a third exemplary embodiment for generating sequence pairs in which the first and second embodiments are extended to generate TSCs that each have a length of 30 symbols, and a fourth exemplary embodiment for generating sequence pairs in which the third embodiment is extended to generate TSCs that each have a length of 31 symbols.

Embodiment 3

In the third embodiment for generating sequence pairs of the present invention, TSCs that each have a length of 30 symbols are generated.

The length of each TSC is determined by N'=2N+10, and is 30 symbols when N=10. Assuming that x is a TSC sequence with a length of 30 symbols, x is represented by Equation (11):

$$x = (x_0, \ldots, x_{29}) = \underbrace{(a_5, \ldots, a_9}_{A'}, \underbrace{a_0, \ldots, a_5, \ldots, a_9}_{A}, \underbrace{b_5, \ldots, b_9}_{B'}, \underbrace{b_0, \ldots, b_5, \ldots, b_9}_{B}) \quad (11)$$

In Equation (11), A' and B' as well as A and B can be generated according to the first or second embodiment of the present invention.

Binary TSCs generated as described above, each having a length of 30 symbols, correspond to TSC#0 to TSC#7 from each of which the first bit is excluded.

Embodiment 4

In the fourth embodiment for generating sequence pairs of the present invention, TSCs that each have a length of 31 symbols are generated from the 30-symbol-length TSCs constructed according to the third embodiment for generating sequence pairs of the present invention.

Figure 8:
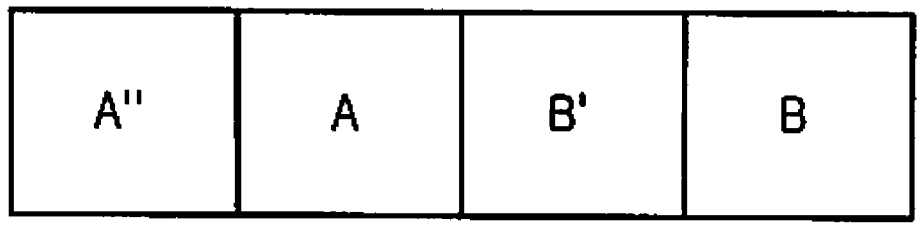
FIG. 8 is a diagram illustrating a structure of a TSC in accordance with an exemplary embodiment of the present invention.
Figure 9:
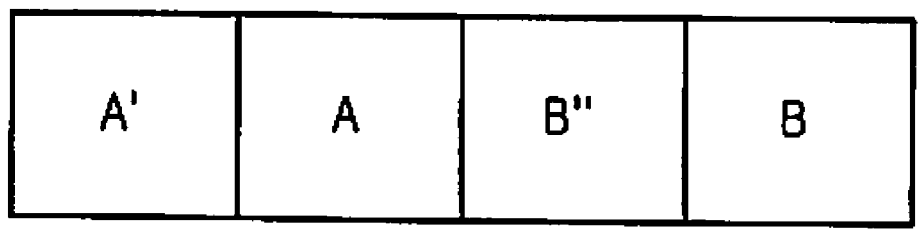
FIG. 9 is a diagram illustrating a structure of a TSC in accordance with an exemplary embodiment of the present invention.

Assuming that sequence A" is a sequence obtained by copying last 6 symbols of the sequence A, the structure of each TSC with a length of 31 symbols is as illustrated in FIG. 8. When compared to the sequence B', it can be noted that the sequence A" is longer than the sequence B' by 1 symbol. As illustrated in FIG. 9, it is also possible to maintain the length of the sequence A' at 5 symbols, and construct the sequence B' as a sequence with a length of 6 symbols (sequence B"). FIGS. 8 and 9 have the same correlation properties. TSCs that each have a length of 31 symbols and the structure of FIG. 8 can be defined by Equation (12):

$$x = (x_0, \ldots, x_{30}) = \underbrace{(a_4, \ldots, a_9}_{A''}, \underbrace{a_0, \ldots, a_5, \ldots, a_9}_{A}, \underbrace{b_5, \ldots, b_9}_{B'}, \underbrace{b_0, \ldots, b_5, \ldots, b_9}_{B}) \quad (12)$$

Assuming that a channel impulse response is $h=(h_0, h_1, \ldots, h_L)$, in a state where there is no CCI, a received signal sample in a receiver is $$y_i = \sum_j h_j x_{i-j} + n_i \text{ (for } i = 5, \ldots, 15 \text{ and } i = 21, \ldots, 30).$$

Since $(x_0, \ldots, X_5)=(x_{10}, \ldots, x_{15})=(a_4, \ldots, a_9)$, a relationship of $$\sum_j h_j x_{5-j} = \sum_j h_j x_{15-j} \qquad (5)$$

is established. Thus, a received signal sample $y^*_{15}$ at i=15 can be obtained by $y^*_{15}=(y_5+y_{15})/2$. However, additional one symbol within the sequence A" may decrease autocorrelation properties of TSCs, and therefore, this symbol must not be included in the matrix X. If $y^*_i=y_i$ is defined for i=6, . . . , 14 and i=21, . . . , 30, a modified vector representation of the received signal is $y^*=Xh^t+n$. Here, n denotes a noise vector corresponding to a matrix with a dimension of (20×1), and X can be represented by Equation (13):

$$X = \begin{bmatrix} x_6 & \cdots & x_2 & x_1 \\ x_7 & \cdots & x_3 & x_2 \\ \vdots & \vdots & \vdots & \vdots \\ x_{15} & \cdots & x_{11} & x_{10} \\ x_{21} & \cdots & x_{17} & x_{16} \\ x_{22} & \cdots & x_{18} & x_{17} \\ \vdots & \vdots & \vdots & \vdots \\ x_{30} & \cdots & x_{26} & x_{25} \end{bmatrix} \qquad (13)$$

Accordingly, least square error estimates (LSEE) for a channel is represented by Equation (14):

$$\hat{h}=(X^t X)^{-1} X^t y^* \qquad (14)$$

In Equation (14), $X^t$ denotes a conjugate transpose matrix of X. Even when having two signals, $\hat{X}=[X_0 \; X_1]$ is kept unchanged, as compared to where TSCs each have a length of 30 symbols. Therefore, results obtained by calculating SNR_d for the TSCs with a length of 30 symbols according to Equation (7) can also be applied to the generated TSCs with a length of 31 symbols.

31-symbol-length binary TSCs generated based the above description and FIG. 9 are as illustrated in FIGS. 10 and 11. Further, 31-symbol-length binary TSCs based on FIG. 9 may also be easily generated according to the above description.

According to the present invention, TSCs based on both autocorrelation properties and cross-correlation properties are provided. The use of the inventive TSCs enables data to be efficiently transmitted/received without performance deterioration in a GERAN system. Also, the TSCs according to the present invention can be extended and applied to 16-QAM and 32-QAM used in a GERAN system.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method of generating training sequence codes (TSCs) in a communication system, the method comprising the steps of:
   encoding packet data;
   multiplexing a header to the encoded packet data;
   modulating the multiplexed data;
   inserting TSCs into the modulated data; and
   transmitting the modulated data including the TSCs,
   wherein the TSCs are generated by:
   generating a pair of sequences A and B that have cross-correlation properties and autocorrelation properties;
   generating a protection sequence A' by copying last L symbols of the sequence A;
   generating a protection sequence B' by copying last L symbols of the sequence B;
   generating sequences with a structure of A'AB'B as TSC candidates by using the generated sequences A, B, A', and B'; and
   selecting at least one of the TSC candidates by evaluating signal-to-noise ratio (SNR) degradation of the TSC candidates,
   wherein the cross-correlation properties are determined according to joint channel estimation.

2. The method as claimed in claim 1, wherein each of the TSCs includes 26 symbols, each of the sequences A and B includes 8 symbols, and each of the protection sequences A' and B' includes 5 symbols.

3. The method as claimed in claim 1, wherein each of the TSCs includes 30 symbols, each of the sequences A and B includes 10 symbols, and each of the protection sequences A' and B' includes 5 symbols.

4. The method as claimed in claim 1, wherein each of the TSCs includes 31 symbols, each of the sequences A and B includes 10 symbols, one of the protection sequences A' and B' includes 5 symbols, and the other of the sequences A' and B' includes 6 symbols.

5. An apparatus for transmitting data including training sequence codes (TSCs) in a communication system, the apparatus comprising:
   an encoder for encoding packet data;
   a multiplexer for multiplexing a header to the encoded packet data;
   a modulator for modulating the multiplexed data; and
   a transmitter for inserting TSCs into the modulated data and transmitting the modulated data including the TSCs,
   wherein the TSCs are generated by:
   generating a pair of sequences A and B, which have cross-correlation properties as well as autocorrelation properties;
   generating a protection sequence A' by copying last L symbols of the sequence A, and generating a protection sequence B' by copying last L symbols of the sequence B;
   generating all sequences with a structure of A'AB'B as TSC candidates by using the generated sequences A, B, A', and B'; and
   selecting at least one of the TSC candidates by evaluating signal-to-noise ratio (SNR) degradation of the TSC candidates,
   wherein the cross-correlation properties are determined according to joint channel estimation.

6. The apparatus as claimed in claim 5, wherein each of the TSCs used by the multiplexer comprises 26 symbols, each of the sequences A and B comprises 8 symbols, and each of the protection sequences A' and B' comprises 5 symbols.

7. The apparatus as claimed in claim 5, wherein each of the TSCs used by the multiplexer comprises 30 symbols, each of the sequences A and B comprises 10 symbols, and each of the protection sequences A' and B' comprises 5 symbols.

8. The apparatus as claimed in claim 5, wherein each of the TSCs used by the multiplexer includes 31 symbols, each of the sequences A and B comprises 10 symbols, one of the protection sequences A' and B' comprises 5 symbols, and the other of the sequences A' and B' comprises 6 symbols.

9. An apparatus for receiving data including training sequence codes (TSCs) in a communication system, the apparatus comprising:
- a receiver for receiving the data including the TSCs;
- a demodulation scheme detection and channel estimation unit for detecting a demodulation scheme and estimating channel information by detecting the TSCs from the data; and
- a decoder for decoding the data according to the detected demodulation scheme and the estimated channel information,
- wherein the TSCs used by the demodulation scheme detection and channel estimation unit are generated and stored by:
- generating a pair of sequences A and B, which have cross-correlation properties as well as autocorrelation properties;
- generating a protection sequence A' by copying last L symbols of the sequence A, and generating a protection sequence B' by copying last L symbols of the sequence B;
- generating all sequences with a structure of A' AB' B as TSC candidates by using the generated sequences A, B, A', and B'; and
- selecting at least one of the TSC candidates by evaluating signal-to-noise ratio (SNR) degradation of the TSC candidates,
- wherein the cross-correlation properties are determined according to joint channel estimation.

10. The apparatus as claimed in claim 9, wherein each of the TSCs detected by the demodulation scheme detection and channel estimation unit comprises 26 symbols, each of the sequences A and B comprises 8 symbols, and each of the protection sequences A' and B' comprises 5 symbols.

11. The apparatus as claimed in claim 9, wherein each of the TSCs detected by the demodulation scheme detection and channel estimation unit comprises 30 symbols, each of the sequences A and B comprises 10 symbols, and each of the protection sequences A' and B' comprises 5 symbols.

12. The apparatus as claimed in claim 9, wherein each of the TSCs detected by the demodulation scheme detection and channel estimation unit comprises 31 symbols, each of the sequences A and B includes 10 symbols, one of the protection sequences A' and B' comprises 5 symbols, and the other of the sequences A' and B' comprises 6 symbols.

13. A method of receiving data including training sequence codes (TSCs) in a communication system, the method comprising the steps of:
- receiving the data including the TSCs;
- detecting a demodulation scheme and estimating channel information by detecting the TSCs from the data; and
- demodulating and decoding the data according to the detected demodulation scheme and the estimated channel information,
- wherein the TSCs are generated and stored by:
- generating a pair of sequences A and B that have cross-correlation properties as well as autocorrelation properties;
- generating a protection sequence A' by copying last L symbols of the sequence A, and generating a protection sequence B' by copying last L symbols of the sequence B;
- generating all sequences with a structure of A' AB' B as TSC candidates by using the generated sequences A, B, A', and B'; and
- selecting at least one of the TSC candidates by evaluating signal-to-noise ratio (SNR) degradation of the TSC candidates,
- wherein the cross-correlation properties are determined according to joint channel estimation.

* * * * *